(12) United States Patent
Guo et al.

(10) Patent No.: US 11,069,935 B2
(45) Date of Patent: Jul. 20, 2021

(54) CELL AND BATTERY

(71) Applicant: NINGDE AMPEREX TECHNOLOGY LIMITED, Ningde (CN)

(72) Inventors: Peipei Guo, Ningde (CN); Ping He, Ningde (CN); Yejun Peng, Ningde (CN); Jianwei Lin, Ningde (CN); Bin Xie, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 181 days.

(21) Appl. No.: 16/259,948

(22) Filed: Jan. 28, 2019

(65) Prior Publication Data

US 2020/0013995 A1 Jan. 9, 2020

(30) Foreign Application Priority Data

Jul. 5, 2018 (CN) .......................... 201810732373.6

(51) Int. Cl.
*H01M 50/116* (2021.01)
*H01M 10/0525* (2010.01)

(52) U.S. Cl.
CPC ..... *H01M 50/116* (2021.01); *H01M 10/0525* (2013.01)

(58) Field of Classification Search
CPC .. H01M 2/027; H01M 2/0272; H01M 2/0275; H01M 2/06; H01M 2/24; H01M 2/263; H01M 10/0525; H01M 50/116
USPC .......................................................... 429/66
See application file for complete search history.

(56) References Cited

U.S. PATENT DOCUMENTS

| | | | | |
|---|---|---|---|---|
| 2013/0284531 | A1* | 10/2013 | Oonuma | H01M 2/0469 180/68.5 |
| 2018/0025852 | A1* | 1/2018 | Aoki | H01G 11/72 361/502 |
| 2018/0069206 | A1* | 3/2018 | Fallourd | H01M 10/044 |
| 2018/0102528 | A1* | 4/2018 | Negishi | H01M 2/06 |
| 2018/0145284 | A1* | 5/2018 | Watanabe | B32B 15/085 |

* cited by examiner

*Primary Examiner* — James M Erwin

(74) *Attorney, Agent, or Firm* — Morgan, Lewis & Bockius LLP

(57) ABSTRACT

A cell and a battery are provided. The cell includes an electrode assembly and a packaging bag, the electrode assembly includes a first electrode sheet provided with a first coating layer and a first uncoated region, the packaging bag includes a first body, the electrode assembly is disposed in the packaging bag, and the first uncoated region is electrically connected with the first body. Further, the electrode assembly may further include a second electrode sheet provided with a second coating layer and a second uncoated region, the packaging bag may further include a second body, and the second uncoated region is electrically connected with the second body.

20 Claims, 9 Drawing Sheets

CELL AND BATTERY

CROSS-REFERENCE TO RELATED APPLICATION

This application claims priority to and benefits of Chinese Patent Application Serial No. 201810732373.6, filed with the State Intellectual Property Office of P. R. China on Jul. 5, 2018, the entire content of which is incorporated herein by reference.

TECHNICAL FIELD

The present disclosure relates to the field of battery, and more particularly to a cell and a battery having the same.

BACKGROUND

Secondary batteries have been widely used in various kinds of electronic products. With the development of electronic products towards miniaturization and intellectualization, higher requirements have been put forward for the energy density and safety performance of the secondary battery, which requires the battery to provide more energy as possible in a smaller volume and to have a reliable safety performance.

In the related art, the secondary battery occupies a larger space, and gases are often produced due to an inevitable side reaction during charging and discharging cycles of the secondary battery, which causes the expansion of a main body of the battery. When the gas production exceeds a bearing limit of a packaging housing of the battery, it is possible that continued use will incur a risk of explosion and fire, thereby leaving a potential safety hazards in the use of the secondary battery.

SUMMARY

Embodiments of the present disclosure seek to solve at least one of the problems existing in the related art. For this, embodiments of the present disclosure provides a cell, which is very convenient for charging and discharging, and has a small volume, a high energy density, and a high safety performance.

The cell according to embodiments of the present disclosure includes an electrode assembly and a packaging bag, the electrode assembly includes a first electrode sheet provided with a first coating layer and a first uncoated region. The packaging bag includes a first body, the electrode assembly is disposed in the packaging bag, and the first uncoated region is electrically connected with the first body.

In some embodiments of the present disclosure, the first body includes a first conductive region, and the first conductive region includes a first metal layer and a first fusion layer disposed on a first surface of the first metal layer, and the first fusion layer is disposed between the electrode assembly and the first metal layer.

In some embodiments of the present disclosure, the first uncoated region is electrically connected with the first metal layer.

In some embodiments of the present disclosure, the first fusion layer is provided with a first recessed portion, the first recessed portion is provided with a first conductive binder layer, and the first uncoated region is electrically connected with the first metal layer via the first conductive binder layer.

In some embodiments of the present disclosure, a cohesive force between the first conductive binder layer and the first metal layer is less than that between the first conductive binder layer and the first uncoated region.

In some embodiments of the present disclosure, the first body further includes a first protective layer disposed on a second surface of the first metal layer.

In some embodiments of the present disclosure, the first protective layer is provided with a third recessed portion, and the third recessed portion is provided with a first conductive element electrically connected with the first metal layer.

In some embodiments of the present disclosure, the electrode assembly further includes a second electrode sheet provided with a second coating layer and a second uncoated region; and the packaging bag further includes a second body connected with or positioned space apart from the first body, and the second uncoated region is electrically connected with the second body.

In some embodiments of the present disclosure, the second body includes a second conductive region, and the second conductive region includes a second metal layer and a second fusion layer disposed on a first surface of the second metal layer, and the second fusion layer is disposed between the electrode assembly and the second metal layer.

In some embodiments of the present disclosure, the second uncoated region is electrically connected with the second metal layer.

In some embodiments of the present disclosure, the second fusion layer is provided with a second recessed portion, the second recessed portion is provided with a second conductive binder layer, and the second uncoated region is electrically connected with the second metal layer via the second conductive binder layer.

In some embodiments of the present disclosure, a cohesive force between the second conductive binder layer and the second metal layer is less than that between the second conductive binder layer and the second uncoated region.

In some embodiments of the present disclosure, the second body further includes a second protective layer disposed on a second surface of the second metal layer.

In some embodiments of the present disclosure, the second protective layer is provided with a fourth recessed portion, and the fourth recessed portion is provided with a second conductive element electrically connected with the second metal layer.

Further, in some embodiments of the present disclosure, the electrode assembly further includes a second electrode sheet provided with a second coating layer and a second uncoated region; and the packaging bag further includes a second body, the first body and the second body define an accommodating space, the electrode assembly is received in the accommodating space, and the second uncoated region is electrically connected with the second body.

In some embodiments of the present disclosure, the first body includes a first metal layer and a first fusion layer disposed on a first surface of the first metal layer, and the first fusion layer is disposed between the electrode assembly and the first metal layer. the second body includes a second metal layer and a second fusion layer disposed on a first surface of the second metal layer, and the second fusion layer is disposed between the electrode assembly and the second metal layer. And the first fusion layer and the second fusion layer are disposed opposite to each other.

In some embodiments of the present disclosure, the first uncoated region is electrically connected with the first metal layer, and the second uncoated region is electrically connected with the second metal layer.

In some embodiments of the present disclosure, the first fusion layer is provided with a first recessed portion, the first recessed portion is provided with a first conductive binder layer, and the first uncoated region is electrically connected with first metal layer via the first conductive binder layer.

In some embodiments of the present disclosure, a cohesive force between the first conductive binder layer and the first metal layer is less than that between the first conductive binder layer and the first uncoated region, and less than that between the first fusion layer and the second fusion layer.

In some embodiments of the present disclosure, the second fusion layer is provided with a second recessed portion, the second recessed portion is provided with a second conductive binder layer, and the second uncoated region is electrically connected with the second metal layer via the second conductive binder layer.

In some embodiments of the present disclosure, a cohesive force between the second conductive binder layer and the second metal layer is less than that between the second conductive binder layer and the second uncoated region, and less than that between the first fusion layer and the second fusion layer.

In some embodiments of the present disclosure, the first body further includes a first protective layer disposed on a second surface of the first metal layer.

In some embodiments of the present disclosure, the first protective layer is provided with a third recessed portion, and the third recessed portion is provided with a first conductive element electrically connected with the first metal layer.

In some embodiments of the present disclosure, the second body further includes a second protective layer disposed on a second surface of the second metal layer.

In some embodiments of the present disclosure, the second protective layer is provided with a fourth recessed portion, and the fourth recessed portion is provided with a second conductive element electrically connected with the second metal layer.

In some embodiments of the present disclosure, a sealing portion is formed at an end of the first body and an end of the second body respectively, configured to seal the accommodating space and provided with an insulating layer at an edge thereof.

In some embodiments of the present disclosure, the electrode assembly is formed by sequentially stacking or winding a plurality of the first electrode sheets, a plurality of separators, and a plurality of the second electrode sheets. The first uncoated regions of the plurality of the first electrode sheets are electrically interconnected to form a third conductive element, and the third conductive element is electrically connected with the first metal layer. And the second uncoated regions of the plurality of the second electrode sheets are electrically interconnected to form a fourth conductive element, and the fourth conductive element is electrically connected with the second metal layer.

Further, embodiments of the present disclosure further provide a battery including any one of the cell as described above.

In some embodiments of the present disclosure, the battery includes a housing and the cell as described above, and the cell is disposed in the housing.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
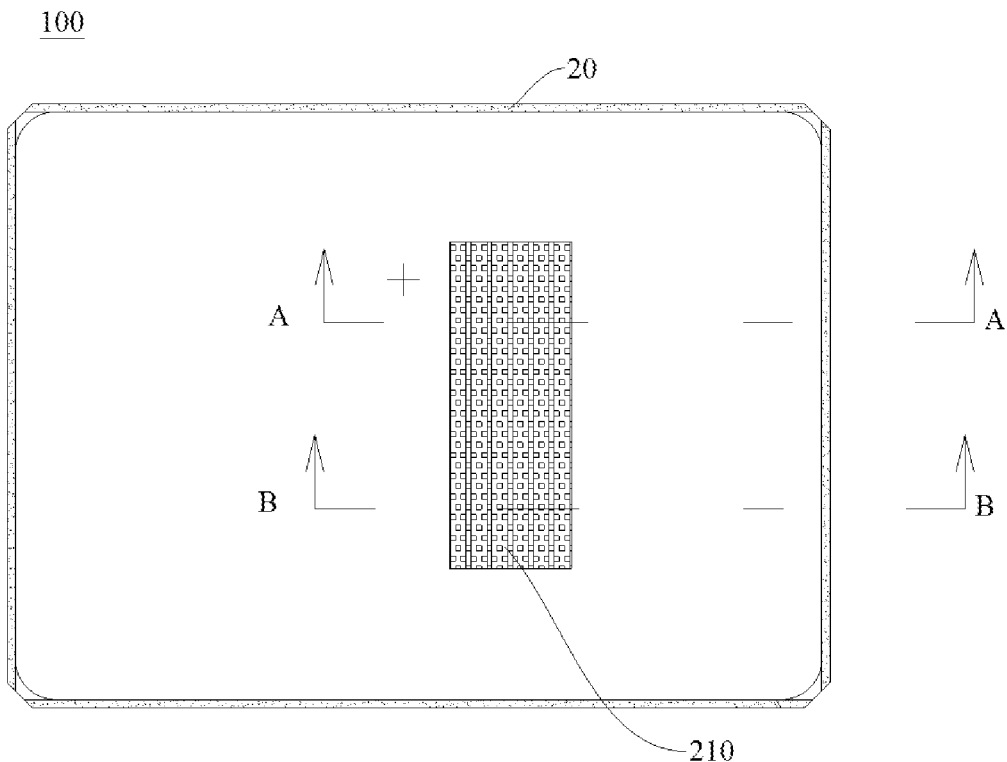
FIG. 1 is a schematic diagram of a cell according to an embodiment of the present disclosure.

REFERENCE NUMERALS cell 100;
electrode assembly 10;
first electrode sheet 110, first coating layer 111, first uncoated region 112, first current collector 113;
second electrode sheet 120, second coating layer 121, second uncoated region 122, second current collector 123;
separator 130;
packaging bag 20;
first body 210, first conductive region 211, first metal layer 211a, first fusion layer 211b, first conductive binder layer 211c, first recessed portion 211d, first protective layer 212, first conductive element 212a, third recessed portion 212b;
second body 220, second conductive region 221, second metal layer 221a, second fusion layer 221b, second conductive binder layer 221c, second recessed portion 221d, second protective layer 222, second conductive element 222a, fourth recessed portion 222b;
sealing portion 230, insulating layer 240, third conductive element 250, fourth conductive element 260.

DETAILED DESCRIPTION

Reference will be made in detail to embodiments of the present disclosure. The embodiments described herein with reference to drawings are illustrative, and used to generally understand the present disclosure. The embodiments shall not be construed to limit the present disclosure. The same or similar elements and the elements having same or similar functions are denoted by like reference numerals throughout the descriptions.

In the specification, it is to be understood that terms such as "central", "longitudinal", "lateral", "length", "width", "thickness", "upper", "lower", "front", "rear", "left", "right", "inner", "outer", "vertical", "horizontal" and "circumferential" should be construed to refer to the orientation as then described or as shown in the drawings under discussion. These relative terms are only for convenience of description, but do not indicate or imply that the device or element referred to must have a particular orientation, or be constructed or operated in a particular orientation, and thus shall not be construed to limit the present disclosure. In addition, the feature defined with "first" and "second" may explicitly or implicitly include one or more of this feature. In the description of the present disclosure, a phase of "a plurality of" means two or more than two, unless specified otherwise.

In the description of the present disclosure, it should be understood that, unless specified or limited otherwise, the terms "mounted", "coupled", "connected" and the like are used broadly, and may be, for example, fixed connections, detachable connections, or integral connections; may also be mechanical or electrical connections; may also be direct connections or indirect connections via intervening structures; and may also be inner communications of two elements, which can be understood by those skilled in the art according to specific situations.

In general, a lithium ion secondary battery includes a positive electrode sheet having a lithium-base oxide as a positive active material and a negative electrode sheet having a carbon material as a negative active material. The positive electrode sheet and the negative electrode sheet are separated by a separator (e.g., a microporous polymer separator), which allows lithium ions to shuttle between the two electrodes. Depending on electrolytes used for the lithium ion secondary battery, batteries may be further classified into a liquid electrolyte battery and a polymer electrolyte battery. For example, a secondary battery using a liquid electrolyte is referred to as the "lithium ion secondary battery", while a secondary battery using a polymer electrolyte is referred to as a "lithium polymer secondary battery". The lithium ion secondary battery may have various shapes, including, such as, a cylindrical lithium ion secondary battery and a pouch-type lithium ion secondary battery, etc.

As positive active material (such as LiCoO2, LiFePO4, etc.) and the negative active material (such as natural graphite, artificial graphite, etc.) are stable in the atmosphere and easy to be processed in industrial practice, and battery units are usually assembled in a discharge state. During charging, the two electrodes are connected from outside to a power source, so that electrons are released from the positive electrode to the negative electrode. At the same time, lithium ions move from the positive electrode to the negative electrode through the electrolyte. In this way, external energy is electrochemically stored as chemical energy in the negative and positive materials with different chemical potentials (i.e., the positive electrode has a high potential, and the negative electrode has a low potential). During discharging, the electrons move outwards from the negative electrode through an external carrier (e.g., a circuit in a mobile phone or an engine in an electric vehicle) to work, while the lithium ions move from the negative electrode to the positive electrode through the electrolyte. This is also known as a "rocking chair" battery, where the lithium ions shuttle between the negative electrode and the positive electrode during the charging and discharging cycle of the battery.

The pouch-type lithium ion secondary battery includes a pouch-type housing and an electrode assembly. The pouch-type housing includes a top housing and a bottom housing, and the electrode assembly is accommodated in the housing. The top housing and the bottom housing are jointed at a side thereof, and are open at the other side thereof to receive the electrode assembly. An accommodating space for receiving the electrode assembly is defined in the bottom housing. A top sealing portion and a bottom sealing portion are formed by such as thermal bonding a top periphery and a bottom periphery of the housing.

Further, the housing has a multi-layer structure, and includes a thermal bonding layer having a thermal bonding characteristic configured for sealing, a metal layer made of a metal material and configured for maintaining a mechanical strength and for resisting water vapor, and an insulating layer.

The electrode assembly may include a positive electrode sheet, a negative electrode sheet and a separator disposed between the positive electrode sheet and the negative electrode sheet, a positive tab is electrically connected with the positive electrode sheet, and a negative tab is electrically connected with the negative electrode sheet. The electrode assembly may be formed by sequentially winding or stacking the positive electrode sheet, the separator and the negative electrode sheet.

The positive electrode sheet includes a positive current collector and a positive active material layer containing a lithium-base oxide coated on a surface of the positive current collector, and the positive current collector may use an aluminum foil. The positive tab may be welded to the positive current collector, or may be formed by directly cutting the positive current collector. The material of the positive tab may be aluminum.

The negative electrode sheet includes a negative current collector and a negative active material disposed on the negative current collector, the negative current collector may use a copper foil, and the negative active material may include a carbon material. The negative tab may be welded to the negative current collector, or may be formed by directly cutting the negative current collector. The material of the negative tab may be nickel or nickel alloy, etc.

The separator is disposed between the positive electrode sheet and the negative electrode sheet to play an insulating role. The separator may include polyethylene, polypropylene or a composition of polyethylene and polypropylene. In an embodiment of the present disclosure, the separator may be made of polyethylene, polypropylene or a composition of polyethylene and polypropylene. Moreover, a width of the separator is greater than that of the positive electrode sheet and the negative electrode sheet, thereby effectively preventing a short circuit between the positive electrode sheet and the negative electrode sheet.

In the following, a cell according to embodiments of the present disclosure will be described in detail with reference to FIG. 1 to FIG. 18.

As illustrated in FIG. 1 to FIG. 6, the cell 100 according to embodiments of the present disclosure includes an electrode assembly 10 and a packaging bag 20, the electrode assembly 10 includes a first electrode sheet 110, and the first electrode sheet 110 is provided with a first coating layer 111 and a first uncoated region 112. It should be illustrated that, the first electrode sheet 110 may include a first current collector 113, and the first current collector 113 is provided with a first coating layer 111 coated with a first active material and a first uncoated region 112. The packaging bag 20 includes a first body 210, the electrode assembly 10 is disposed in the packaging bag 20, and the first uncoated region 112 is electrically connected with the first body 210.

In an embodiment of the present disclosure, the electrode assembly 10 further includes a second electrode sheet 120, and the second electrode sheet 120 is provided with a second coating layer 121 and a second uncoated region 122. It should be illustrated that, the second electrode sheet 120 may include a second current collector 123, and the second current collector 123 is provided with a second coating layer 121 coated with a second active material and a second uncoated region 122. The packaging bag 20 further includes a second body 220, and the second uncoated region 122 is electrically connected with the second body 220.

The first electrode sheet 110 and the second electrode sheet 120 of the electrode assembly 10 are electrically connected with the packaging bag 20 by the electrical connections between the first uncoated region 112 and the first body 210, and between the second uncoated region 122 and the second body 220, such that the charging and discharging of the electrode assembly 10 may be achieved via the first body 210 and the second body 220 of the packaging bag 20, which is very convenient. Moreover, this configuration does not need to arrange a positive tab and a negative tab outside the cell 100, which may effectively save the space occupied by the cell 100, improve the space utilization of the cell 100 to further enhance the energy density of the cell 100, and is also convenient for arrangement of the cell 100 in various application devices. It should be illustrated that, it is also feasible that only the first body 210 or the second body 220 is disposed on the packaging bag 20 as the positive tab or the negative tab within the cell, and a negative tab or a positive tab is correspondingly disposed outside the cell, which is not limited by the present disclosure.

Figure 2:
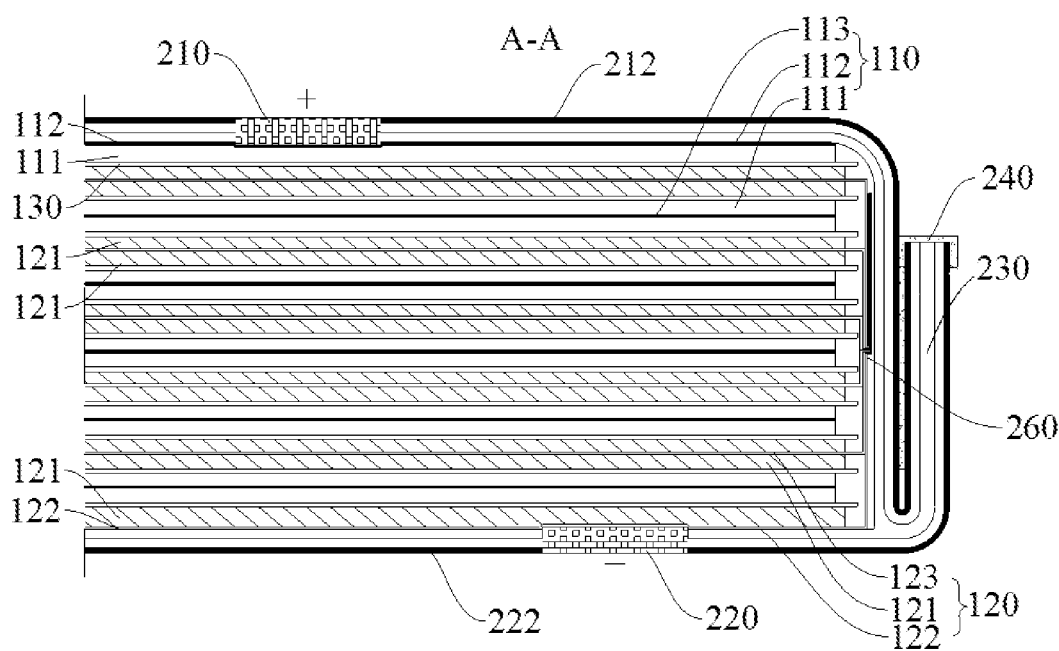
FIG. 2 is a sectional view of the cell shown in FIG. 1 in an A-A direction.

As illustrated in FIG. 2, in an embodiment of the present disclosure, the first body 210 and the second body 220 may be disposed in the packaging bag 20 by embedding, coupling or pasting, etc. And the first body 210 may be indirectly connected or coupled with the second body 220. Other parts, except the first body 210 and the second body 220, of the packaging bag 20 may apply configurations of a common packaging bag used in the related art. For example, the other parts of the packaging bag 20 may include an insulating layer, a metal layer and a fusion layer in turn from outside to inside.

Figure 3:
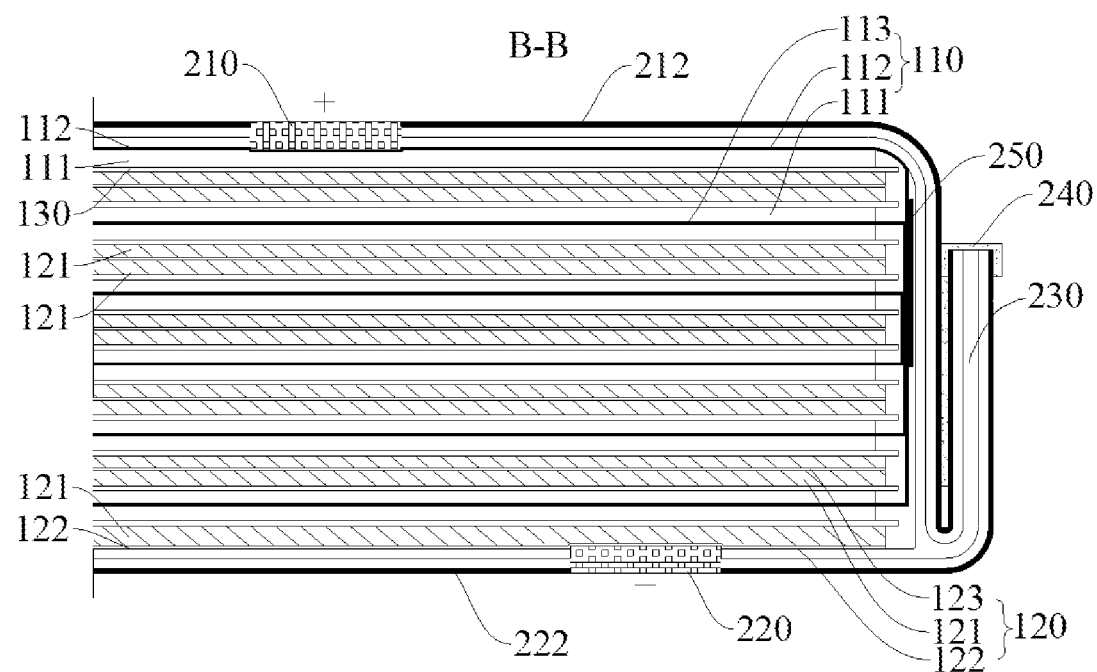
FIG. 3 is a sectional view of the cell shown in FIG. 1 in a B-B direction.
Figure 4:
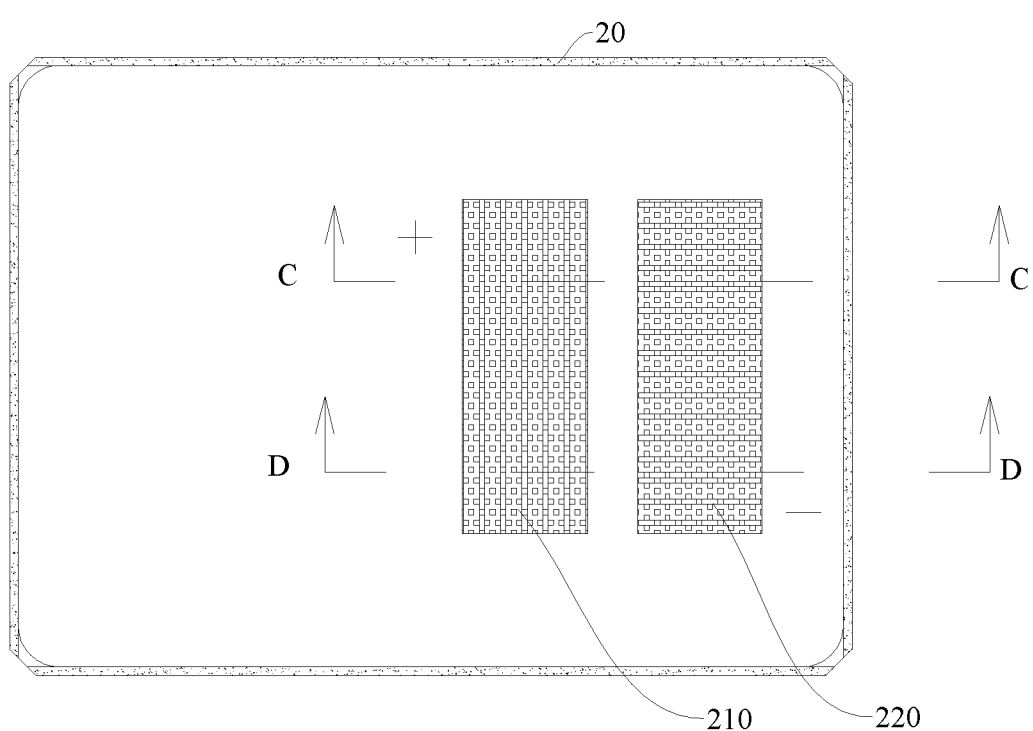
FIG. 4 is a schematic diagram of a cell according to another embodiment of the present disclosure.
Figure 5:
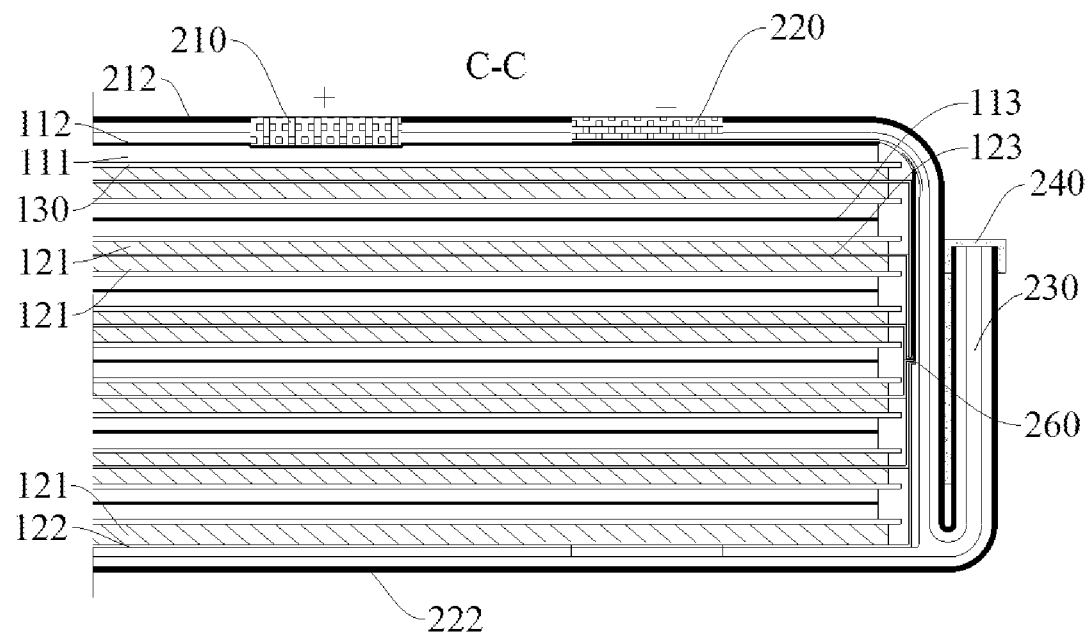
FIG. 5 is a sectional view of the cell shown in FIG. 4 in a C-C direction.
Figure 6:
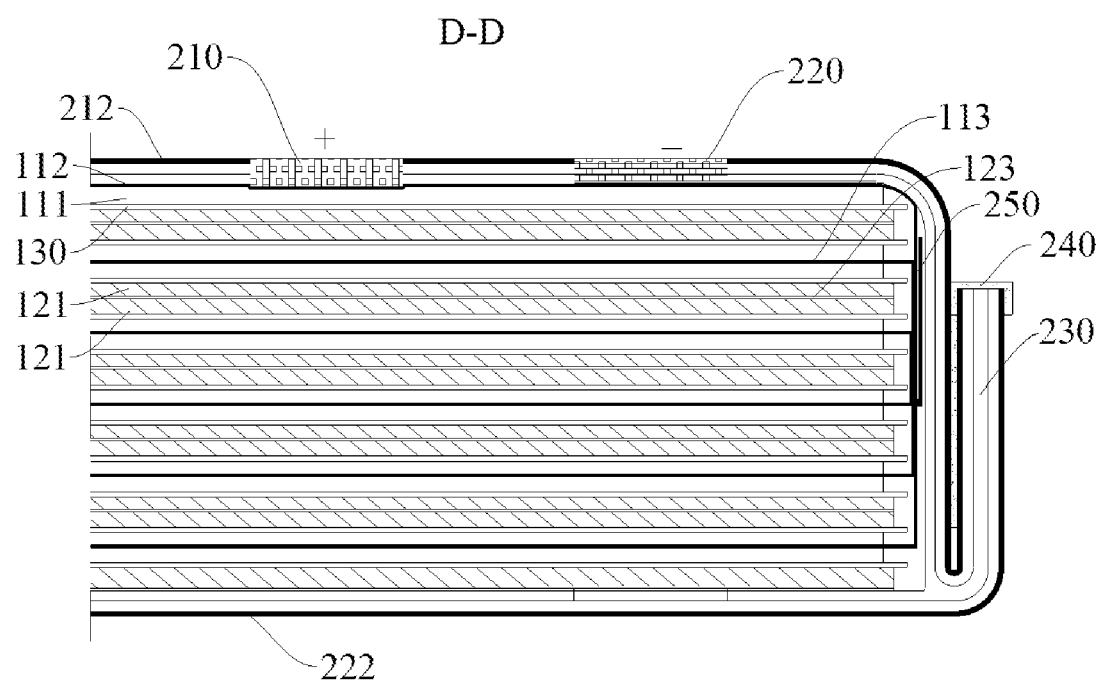
FIG. 6 is a sectional view of the cell shown in FIG. 4 in a D-D direction.
Figure 7:
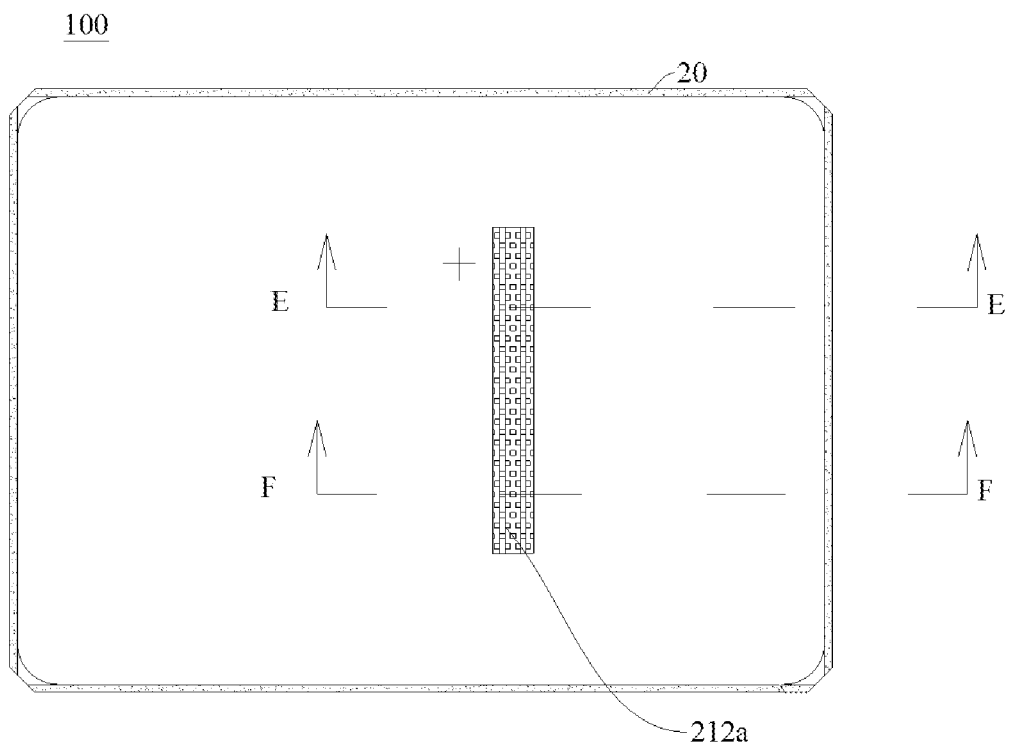
FIG. 7 is a schematic diagram of a cell according to another embodiment of the present disclosure.

In an embodiment of the present disclosure, the first body 210 and the second body 220 may be disposed on different surfaces of the packaging bag 20, for example, one of the first body 210 and the second body 220 is disposed on an upper surface of the packaging bag 20, and the other one is disposed on a lower surface of the packaging bag 20, as illustrated in FIG. 1 to FIG. 3. In some embodiments, the first body 210 and the second body 220 may be disposed on a same surface of the packaging bag 20, for example, both the first body 210 and the second body 220 are disposed on the upper surface or the lower surface of the packaging bag 20, as illustrated in FIG. 4 to FIG. 6.

In an embodiment of the present disclosure, the first body 210 is electrically connected with the first uncoated region 112 via a first conductive binder layer 211c, and a cohesive force between the first conductive binder layer 211c and the first body 210 is less than that between the first conductive binder layer 211c and the first uncoated region 112. In some embodiments, the second body 220 may also be electrically connected with the second uncoated region 122 via a second conductive binder layer 221c, and a cohesive force between the second conductive binder layer 221c and the second body 120 is less than that between the second conductive binder layer 221c and the second uncoated region 122. As a difference exists in the cohesive force between the first conductive binder layer 211c and the first body 210 and between the first conductive binder layer 211c and the first uncoated region 112, and a difference exists in the cohesive force between the second conductive binder layer 221c and the second body 220 and between the second conductive binder layer 221c and the second uncoated region 122, when gas is generated in the packaging bag 20 to cause the expansion of the cell, the expansion may make the first body 210 separate from the first uncoated region 112 and make the second body 220 separate from the second uncoated region 122, which may cut off the charging and discharging of the cell, thereby avoiding the risk of explosion and fire caused by continued use of the cell, and improving the safety of the cell.

In an embodiment of the present disclosure, the first body 210 may include a fusion layer and a metal layer, the fusion layer may include a first fusion layer, the metal layer may include a first metal layer, and the fusion layer may be integrally disposed or integrally formed with the fusion layers of other parts of the packaging bag 20. In some embodiments, the fusion layer of the first body 210 is provided with a recessed portion, the recessed portion includes a first recessed portion 211d, in which the first conductive binder layer 211c is disposed, and the first uncoated region 112 is electrically connected with the metal layer of the first body 210 via the first conductive binder layer 211c. Similarly, the second body 220 may use a similar structure to the first body 210, i.e., the second body 220 may also include a fusion layer and a metal layer, the fusion layer includes a second fusion layer 221b, the metal layer includes a second metal layer, the fusion layer of the second body 220 may include a recessed portion, and the recessed portion includes a second recessed portion 221d.

In some embodiments of the present disclosure, the first body 210 may include a conductive region and a nonconductive region. The first uncoated region 112 is electrically connected with the conductive region of the first body 210 via the first conductive binder layer 211c. In some embodiments, the second body 220 may also include a conductive region and a nonconductive region. The second uncoated region 122 is electrically connected with the conductive region of the second body 220 via the second conductive binder layer 221c.

In some embodiments of the present disclosure, as illustrated in FIG. 3, the electrode assembly 10 may be formed by sequentially stacking a plurality of the first electrode sheets 110, a plurality of separators 130 and a plurality of the second electrode sheets 120. The first uncoated regions 112 of the plurality of the first electrode sheets 110 are electrically interconnected to form a third conductive element 250, and the third conductive element 250 is electrically connected with the first body 210 or the metal layer of the first body 210. As illustrated in FIG. 2, the second uncoated regions 122 of the plurality of the second electrode sheets 120 are electrically interconnected to form a fourth conductive element 260, and the fourth conductive element 260 is electrically connected with the second body 220 or the metal layer of the second body 220.

It should be illustrated that, when the electrode assembly 10 is configured to a stacked or laminated structure as described above, another uncoated first current collector 113 may be disposed on an upper surface of the stacked or laminated structure, and another uncoated second current collector 123 may be disposed on a lower surface of the stacked or laminated structure. Alternatively, another uncoated second current collector 123 may be disposed on the upper surface of the stacked or laminated structure, and another uncoated first current collector 113 may be disposed on the lower surface of the stacked or laminated structure. Then, the third conductive element 250 formed by the first uncoated regions 112 is electrically connected with this uncoated first current collector 113, and the fourth conductive element 260 formed by the second uncoated regions 122 is electrically connected with this uncoated second current collector 123, as illustrated in FIG. 2 and FIG. 3. Such configurations may also be applied in some embodiments of the present disclosure.

In some embodiments of the present disclosure, the electrode assembly 10 may be formed by winding the plurality of the first electrode sheets 110, the plurality of the separators 130 and the plurality of the second electrode sheets 120 in sequence. The first uncoated regions 112 of the plurality of the first electrode sheets 110 are electrically connected with the first body 210, and the second uncoated regions 122 of the plurality of the second electrode sheets 120 are electrically connected with the second body 220.

In some embodiments of the present disclosure, as illustrated in FIG. 7 to FIG. 15, the cell 100 includes an electrode assembly 10 and a packaging bag 20, the electrode assembly 10 includes a first electrode sheet 110 and a second electrode sheet 120, the first electrode sheet 110 is provided with a first coating layer 111 and a first uncoated region 112, and the second electrode sheet 120 is provided with a second coating layer 121 and a second uncoated region 122. It should be illustrated that, the first electrode sheet 110 may include a first current collector 113, and the first current collector 113 is provided with a first coating layer 111 coated with a first active material and a first uncoated region 112; the second electrode sheet 120 may include a second current collector 123, and the second current collector 123 is provided with a second coating layer 121 coated with a second active material and a second uncoated region 122. The packaging bag 20 includes a first body 210 and a second body 220, the first body 210 and second body 220 define an accommodating space, and the electrode assembly 10 is received in the accommodating space. The first uncoated region 112 is electrically connected with the first body 210, and the second uncoated region 122 is electrically connected with the second body 220.

As described above, the electrode assembly 10 may be charged and discharged by the first body 210 and the second body 220 of the packaging bag 20, which is very convenient. Moreover, this configuration does not need to set a positive tab and a negative tab outside the cell 100, which may effectively save space occupied by the cell 100, improve the space utilization of the cell 100 to further enhance the energy density of the cell 100, and is convenient for arrangement of the cell 100 in various application devices.

Figure 8:
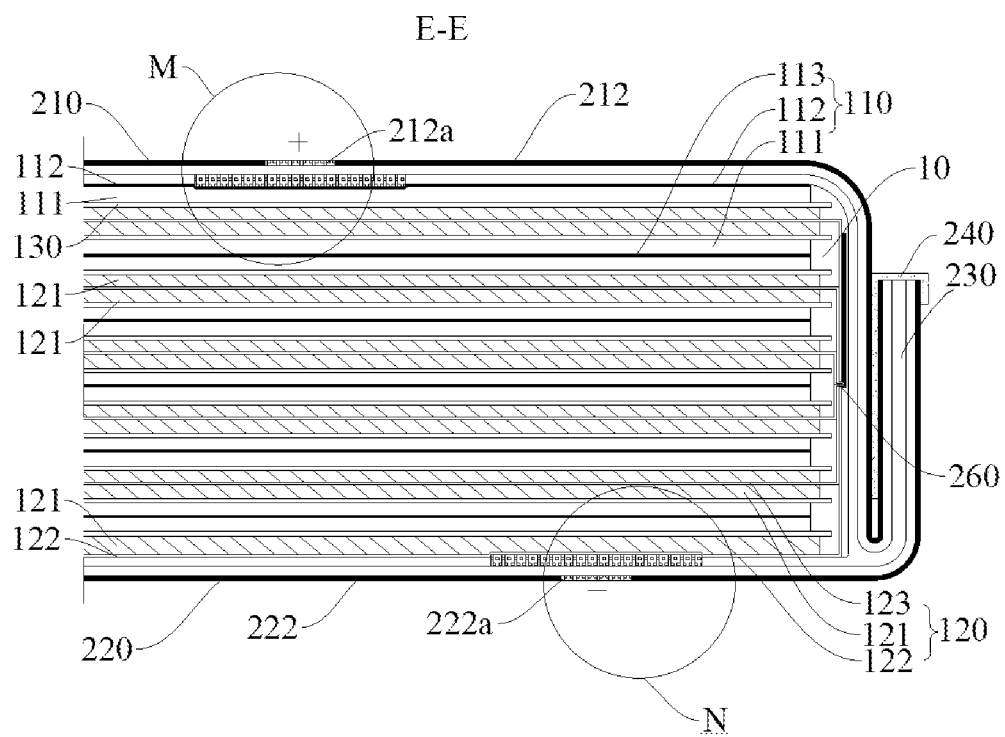
FIG. 8 is a sectional view of the cell shown in FIG. 7 in an E-E direction.
Figure 9:
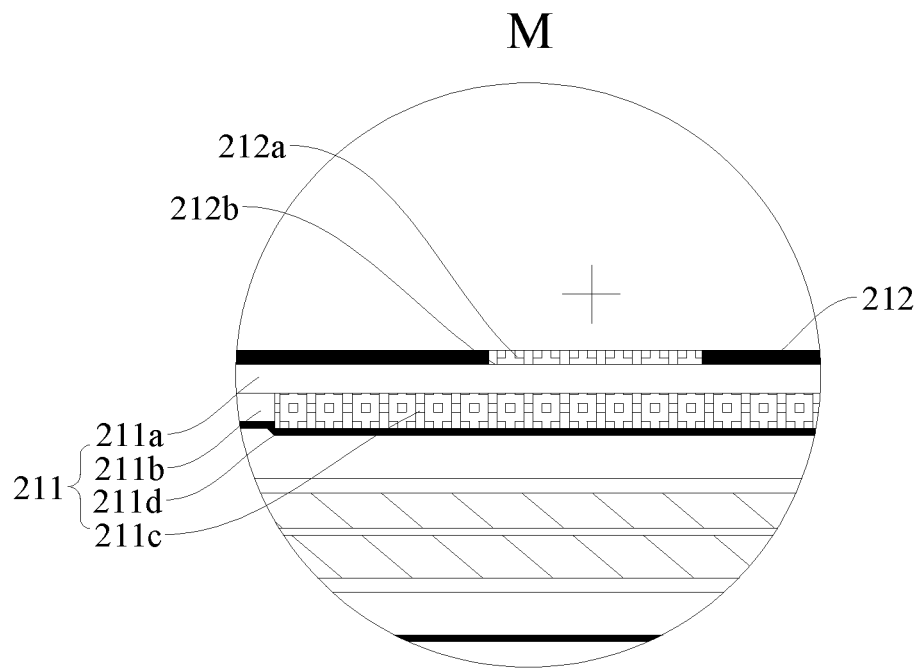
FIG. 9 is an enlarged diagram of the cell at M shown in FIG. 8.
Figure 10:
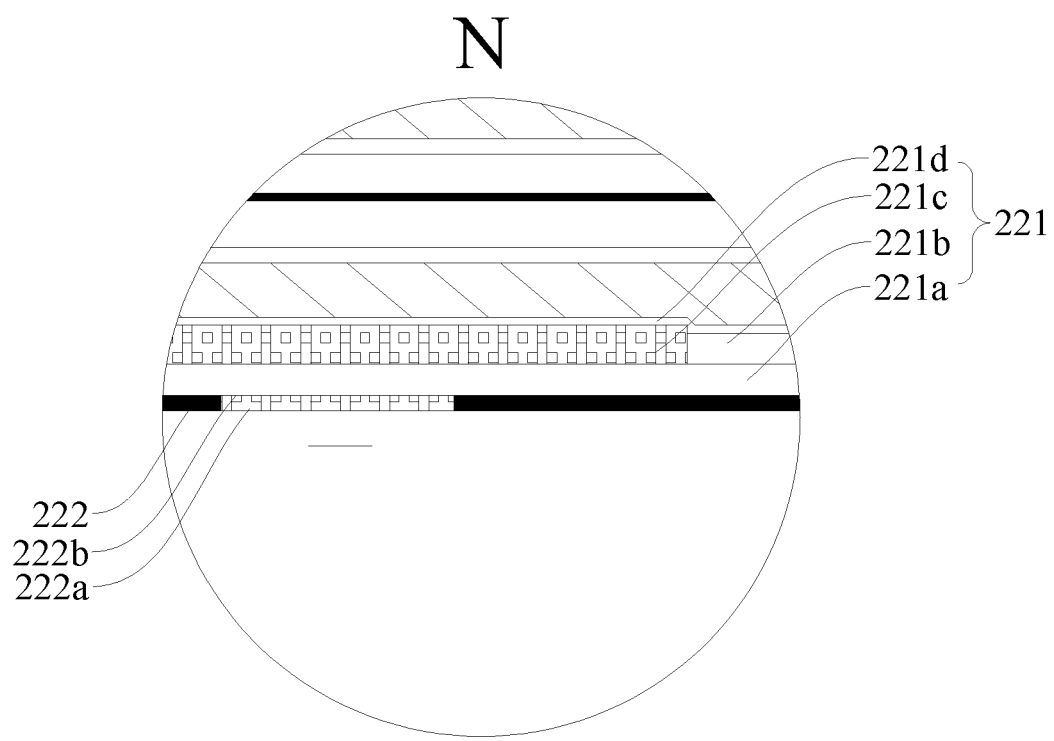
FIG. 10 is an enlarged diagram of the cell at N shown in FIG. 8.

In some embodiments of the present disclosure, as illustrated in FIG. 8 to FIG. 10, the first body 210 includes a first metal layer 211a and a first fusion layer 211b, and the first fusion layer 211b is disposed on a first surface of the first metal layer 211a, i.e., the first fusion layer 211b is disposed between the electrode assembly 10 and the first metal layer 211a. The second body 220 includes a second metal layer 221a and a second fusion layer 221b, and the second fusion layer 221b is disposed on a first surface of the second metal layer 221a, i.e., the second fusion layer 221b is disposed between the electrode assembly 10 and the second metal layer 221a. The first fusion layer 211b and the second fusion layer 221b are disposed opposite to each other.

Specifically, the first metal layer 211a and the second metal layer 221a have good conductivity, and the first fusion layer 211b and the second fusion layer 221b are not conductive. By arranging the first fusion layer 211b and the second fusion layer 221b opposite to each other, an accommodating space is defined for accommodating the electrode assembly 10, and the accommodating space is sealed, thereby resisting the moisture and gas outside the cell into the accommodating space to affect the performance of the cell. This arrangement may also prevent the first metal layer 211a and the second metal layer 221a from conducting with each other. The first metal layer 211a and the second metal layer 221a may include a material with good conductivity like stainless steel, aluminum, etc., and the first fusion layer 211b and the second fusion layer 221b may include polypropylene. In some embodiments of the present disclosure, the first metal layer 211a and the second metal layer 221a may be made of the material with good conductivity like stainless steel, aluminum, etc., and the first fusion layer 211b and the second fusion layer 221b may be made of polypropylene.

In some embodiments of the present disclosure, the first uncoated region 112 is electrically connected with the first metal layer 211a, and the second uncoated region 122 is electrically connected with the second metal layer 221a. This connecting manner may make the electrode assembly 10 electrically connect with the packaging bag 20, without setting a positive tab and a negative tab outside the cell.

In another embodiment of the present disclosure, as illustrated in FIG. 9, the first fusion layer 211b is provided with a first recessed portion 211d, the first recessed portion 211d is provided with a first conductive binder layer 211c, and the first uncoated region 112 is electrically connected with the first metal layer 211a via the first conductive binder layer 211c. Specifically, the first recessed portion 211d has a good positioning effect on a location of the first conductive binder layer 211c, facilitating the arrangement of the first conductive binder layer 211c, and such a configuration will not increase a thickness of the cell 100, and will not reduce the energy density of the cell 100.

In some embodiments of the present disclosure, a cohesive force between the first conductive binder layer 211c and the first metal layer 211a is less than that between the first conductive binder layer 211c and the first uncoated region 112, and less than that between the first fusion layer 211b and the second fusion layer 221b.

It will be understood that, when abnormal gas production of the cell 100 in use causes expansion of the packaging bag 20, as differences exist among the cohesive forces between the first conductive binder layer 211c and the first metal layer 211a, between the first conductive binder layer 211c and the first uncoated region 112, and between the first fusion layer 211b and the second fusion layer 221b, the expansion caused by the abnormal gas production will make the first metal layer 211a disconnect with the first uncoated region 112, while the first fusion layer 211b and the second fusion layer 221b are still connected and sealed, such that the charging and discharging of the cell 100 is cut off, thereby avoiding to cause the risk of explosion and fire during the continued use of the cell, and improving the safety of the cell.

In some embodiments of the present disclosure, as illustrated in FIG. 10, the second fusion layer 221b is provided with a second recessed portion 221d, the second recessed portion 221d is provided with a second conductive binder layer 221c, and the second uncoated region 122 is electrically connected with the second metal layer 221a via the second conductive binder layer 221c. Specifically, the second recessed portion 221d has a good positioning effect on a location of the second conductive binder layer 221c, facilitating the arrangement of the second conductive binder layer 221c, and such a configuration will not increase the thickness of the cell 100, and will not reduce the energy density of the cell 100.

In some embodiments of the present disclosure, a cohesive force between the second conductive binder layer 221c and the second metal layer 221a is less than that between the second conductive binder layer 221c and the second uncoated region 122, and less than that between the first fusion layer 211b and the second fusion layer 221b.

It will be understood that, when abnormal gas production of the cell 100 in use causes expansion of the packaging bag 20, as differences exist among the cohesive forces between the second conductive binder layer 221c and the second metal layer 221a, between the second conductive binder layer 221c and the second uncoated region 122, and between the first fusion layer 211b and the second fusion layer 221b, the expansion caused by the abnormal gas production will make the second metal layer 221a disconnect with the second uncoated region 122, while the first fusion layer 211b and the second fusion layer 221b are still connected and sealed, such that the charging and discharging of the cell 100 is cut off, thereby avoiding to cause the risk of explosion and fire during the continued use of the cell, and improving the safety of the cell.

In some embodiments of the present disclosure, the first body 210 may further include a first protective layer 212 disposed on a second surface of the first metal layer 211a (i.e., the first metal layer 211a is disposed between the first fusion layer 211b and a first protective layer 212), as illustrated in FIG. 8 and FIG. 9. Specifically, the first protective layer 212 may include nylon. In an embodiment, the first protective layer 212 may be made of nylon. The first protective layer 212 and the first fusion layer 211b are nonconductive, and disposed on two surfaces of the first metal layer 211a, respectively. The first protective layer 212 is disposed on an outmost side of the first body 210, so as to play a better insulation and protection role to the electrode assembly 10, the first metal layer 211a and the first fusion layer 211b. It should be illustrated that, the term "outside" used herein refers to a side of the packaging bag 20 away from the electrode assembly 10, and the term "inside" refers to a side opposite to the "outside" (i.e., a side towards the electrode assembly 10).

In some embodiments of the present disclosure, the first protective layer 212 is provided with a third recessed portion 212b, the third recessed portion 212b is provided with a first conductive element 212a, and the first conductive element 212a is electrically connected with the first metal layer 211a, as illustrated in FIG. 8 and FIG. 9. The third recessed portion 212b has a positioning effect on the first conductive element 212a, facilitating the arrangement of the first conductive element 212a, and allows the charging and discharging of the electrode assembly 10 to be achieved at the first conductive element 212a, which will not increase the thickness of the cell 100, thereby saving the space occupied by the cell 100, and improving the space utilization of the cell 100 in various application devices.

In some embodiments of the present disclosure, the second body 220 may further include a second protective layer 222 disposed on a second surface of the second metal layer 221a (i.e., the second metal layer 221a is disposed between the second fusion layer 221b and a second protective layer 222), as illustrated in FIG. 8 and FIG. 10. Specifically, the second protective layer 222 may include nylon. In an embodiment, the second protective layer 222 may be made of nylon. The second protective layer 222 and the second fusion layer 221b are nonconductive and disposed on two surfaces of the second metal layer 221a, respectively. The second protective layer 222 is disposed on the outmost side of the second body 220, so as to play a better insulation and protection role to the electrode assembly 10, the second metal layer 221a and the second fusion layer 221b. As described above, the term "outside" used herein refers to a side of the packaging bag 20 away from the electrode assembly 10, and the term "inside" refers to a side opposite to the "outside".

In some embodiments of the present disclosure, the second protective layer 222 is provided with a fourth recessed portion 222b, the fourth recessed portion 222b is provided with a second conductive element 222a, and the second conductive element 222a is electrically connected with the second metal layer 221a, as illustrated in FIG. 8 and FIG. 10. The fourth recessed portion 222b has a positioning effect on the second conductive element 222a, facilitating the arrangement of the second conductive element 222a, and allows the charging and discharging of the electrode assembly 10 to be achieved at the second conductive element 222a, which will not increase the thickness of the cell 100, thereby saving the space occupied by the cell 100, and improving the space utilization of the cell 100 in various application devices.

As illustrated in FIG. 8, FIG. 11, FIG. 13 to FIG. 15, in some embodiments of the present disclosure, a sealing portion 230 may be formed at an end of the first body 210 and an end of the second body 220 respectively, configured to seal the accommodating space and provided with an insulating layer 240 at an edge thereof. The insulating layer 240 may play a good insulation and protection role to the edge of the sealing portion 230 formed at the end of the first body 210 and the end of the second body 220 in the cell 100, which may avoid a risk of conductive connection between the first metal layer 211a and the second metal layer 221a, and guarantee the safety of a user when using the cell 100, thereby further improving the safety performance of the cell 100.

Figure 16:
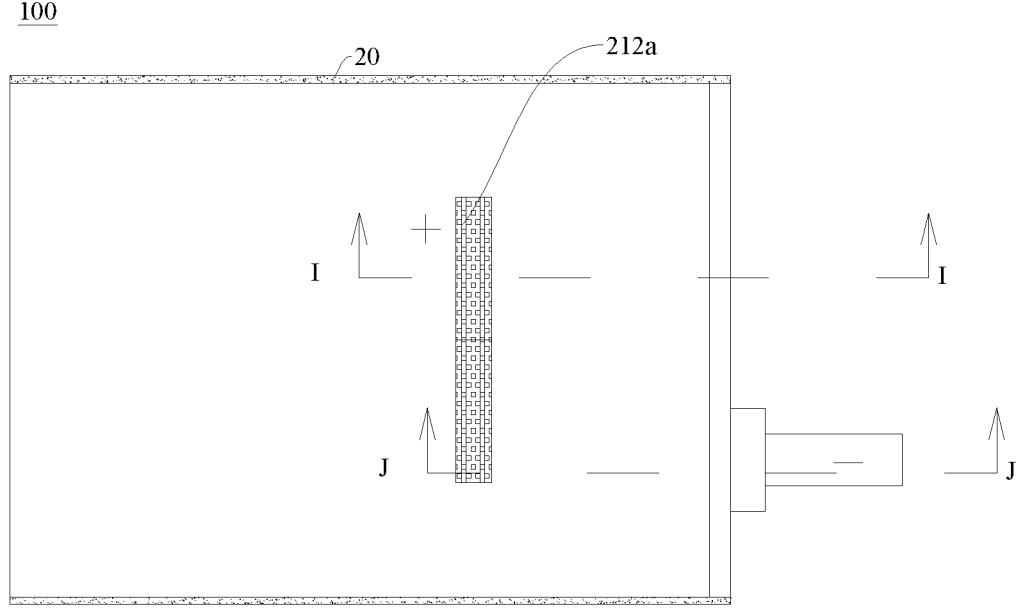
FIG. 16 is a schematic diagram of a cell according to another embodiment of the present disclosure.
Figure 17:
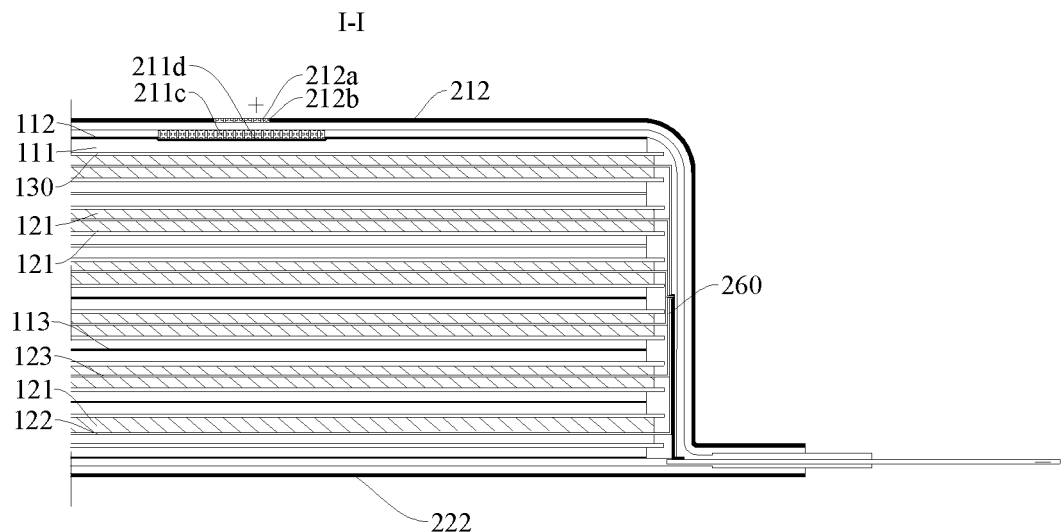
FIG. 17 is a sectional view of the cell shown in FIG. 16 in an I-I direction.
Figure 18:
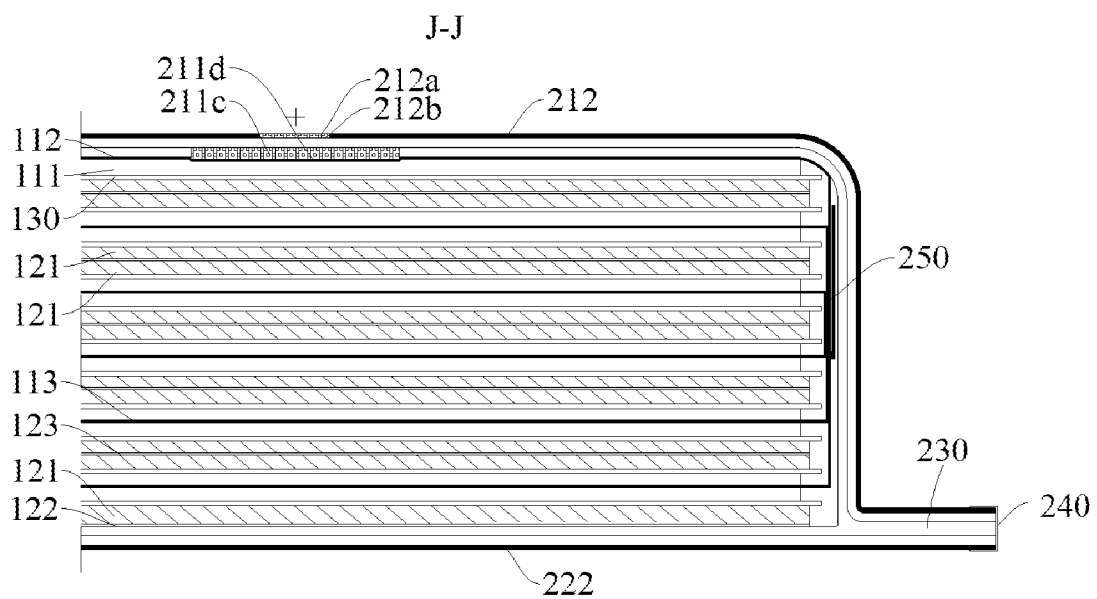
FIG. 18 is a sectional view of the cell shown in FIG. 16 in a J-J direction.

In some embodiments of the present disclosure, as illustrated in FIG. 16 to FIG. 18, only the first body 210 or the second body 220 is configured to be a conductive component, i.e., only the first uncoated region 112 is electrically connected with the first body 210, or only the second uncoated region 122 is electrically connected with the second body 220 to form a tab (e.g., a positive tab or a negative tab), and another tab (e.g., a corresponding negative tab or a corresponding positive tab) is disposed outside the cell 100. It will be appreciated that, it is feasible that only a positive connection of the cell 100 is disposed on a surface of the packaging bag 20, while a negative connection of the cell 100 is disposed outside the packaging bag 20; alternatively, only the negative connection of the cell 100 is disposed on the surface of the packaging bag 20, while the positive connection of the cell 100 is disposed outside the packaging bag 20. Moreover, as described above, this configuration may improve the space utilization and use safety of the cell 100.

Figure 11:
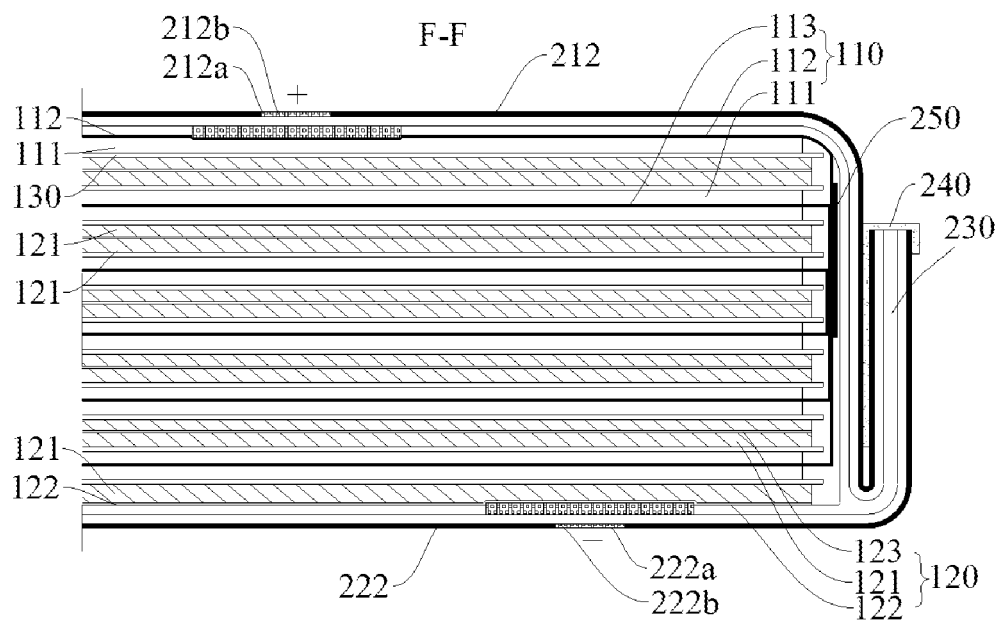
FIG. 11 is a sectional view of the cell shown in FIG. 7 in an F-F direction.
Figure 12:
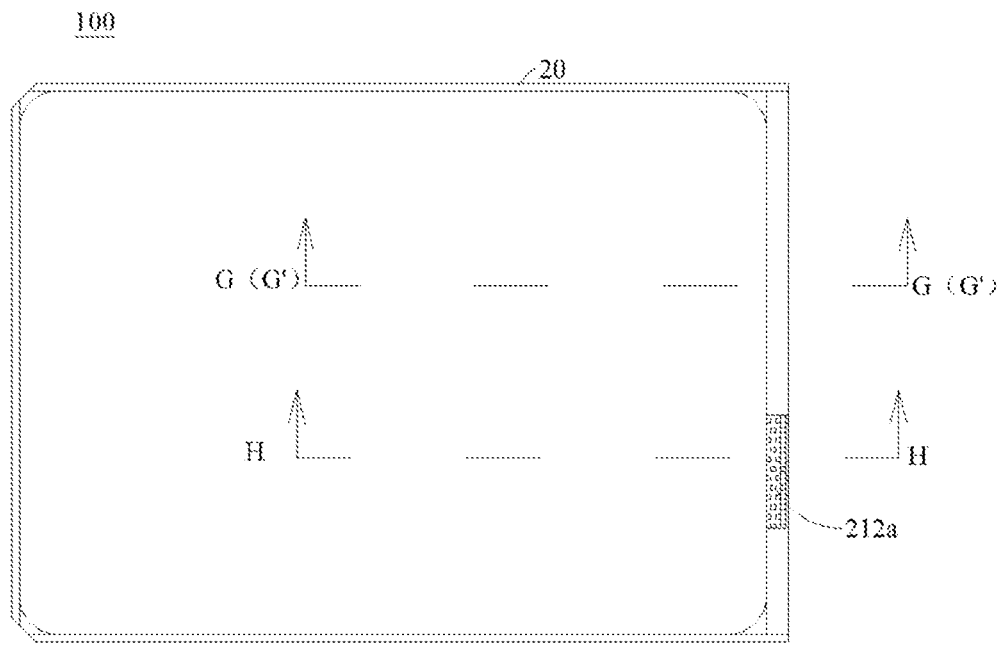
FIG. 12 is a schematic diagram of a cell according to another embodiment of the present disclosure.
Figure 13:
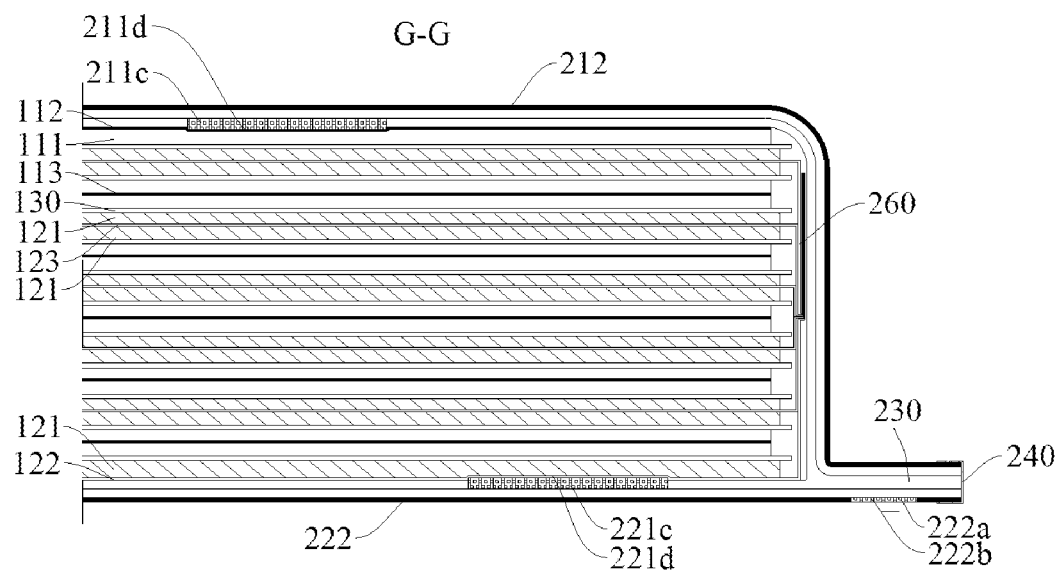
FIG. 13 is a sectional view of the cell shown in FIG. 12 in a G-G direction, where an electrode assembly is formed by stacking.
Figure 14:
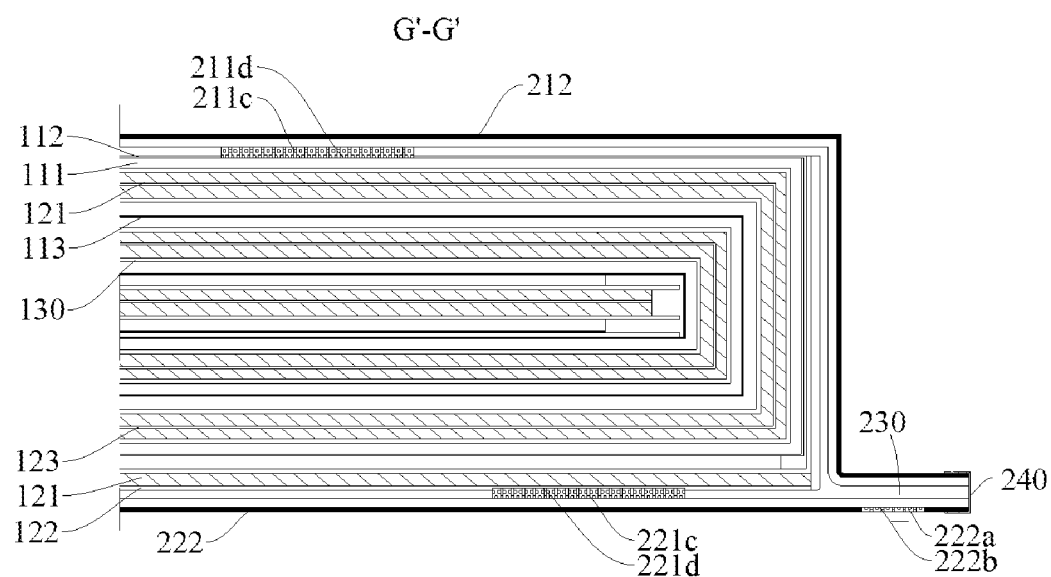
FIG. 14 is a sectional view of the cell shown in FIG. 12 in a G'-G' direction, where an electrode assembly is formed by winding.
Figure 15:
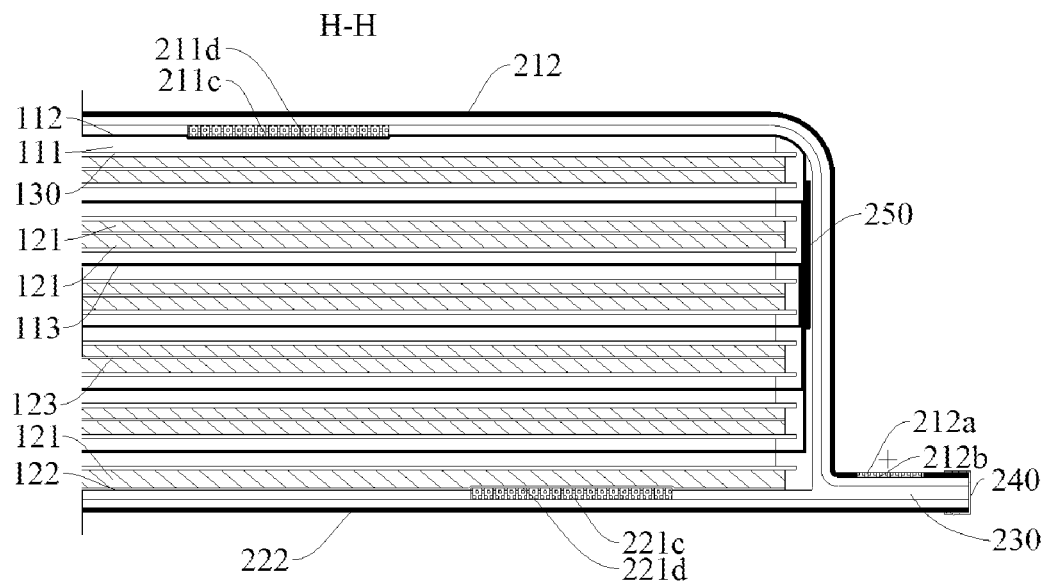
FIG. 15 is a sectional view of the cell shown in FIG. 12 in an H-H direction.

Further, in some embodiments of the present disclosure, the electrode assembly 10 may be formed by sequentially stacking a plurality of the first electrode sheets 110, a plurality of separators 130 and a plurality of the second electrode sheets 120. The first uncoated regions 112 of the plurality of the first electrode sheet 110 are electrically interconnected to form a third conductive element 250, and the third conductive element 250 is electrically connected with the first metal layer 211a, as illustrated in FIG. 11. The second uncoated regions 122 of the plurality of the second electrode sheets 120 are electrically interconnected to form a fourth conductive element 260, and the fourth conductive element 260 is electrically connected with the second metal layer 221a, as illustrated in FIG. 8. Further, when the electrode assembly 10 is configured to a stacked or laminated structure, the stacked or laminated structure as described above may be applied, i.e., the stacked or laminated structure may be provided with a first current collector 113 and a second current collector 123 on an upper surface and a lower surface thereof, respectively, as illustrated in FIG. 8, FIG. 11, FIG. 13 and FIG. 15, which will not be elaborated herein. It will be appreciated that, the electrode assembly 10 may also be formed by sequentially winding the plurality of the first electrode sheets 110, the plurality of the separators 130 and the plurality of the second electrode sheets 120, as illustrated in FIG. 14. It should be illustrated that, the first electrode sheet 110 of the present disclosure may be a positive electrode sheet or a negative electrode sheet, correspondingly, the second electrode sheet 120 may be a negative electrode sheet or a positive electrode sheet.

It will be appreciated that, the negative electrode and the positive electrode illustrated in the drawings are only for the convenience of understanding the present disclosure, and may be exchangeable in practice.

Further, embodiments of the present disclosure also provide a battery, the battery includes a housing and any one of the cell 100 as described above, and the cell 100 is disposed in the housing. The battery may achieve the charging and discharging thereof via the cell 100, without setting tabs outside the cell 100, which may save space occupied by the battery, and improve the space utilization and energy density of the battery. At the same time, when the battery expands in use caused by abnormal gas production, the expansion of the packaging bag 20 of the cell 100 may make the uncoated regions of the electrode assembly 10 separate from the packaging bag 20 to cut off the charging and discharging paths of the battery, preventing the risk of explosion and fire caused by the continued use of the battery, thereby further improving the use safety of the battery.

Reference throughout this specification to "an embodiment" "some embodiments" "an example" "a specific example" or "some examples" means that a particular feature, structure, material, or characteristic described in connection with the embodiment or example is included in at least one embodiment or example of the present disclosure. Thus, the appearances of the phrases such as "in some embodiments" "in one embodiment", "in an embodiment", "in another example" "in an example" "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that the above embodiments may not be construed to limit the present disclosure, changes, alternatives, and modifications may be made in the embodiments without departing from spirit, principles and scope of the present disclosure, and the scope of the present disclosure is defined by the appended claims and equivalents thereof.

What is claimed is:

1. A cell, comprising:
    an electrode assembly, comprising:
        a first electrode sheet having a first surface coated with a first active material layer and a second surface opposite to the first surface, the second surface having a first region uncoated with the first active material layer as a first uncoated region; and
    a packaging bag, receiving the electrode assembly and comprising:
        a first body, electrically connected with the first uncoated region on the second surface via a first conductive binder layer;
    wherein a cohesive force between the first body and the first conductive binder layer is less than that between the first conductive binder layer and the first uncoated region.

2. The cell according to claim 1, wherein the first body comprises:
    a first conductive region, comprising:
        a first metal layer; and
        a first fusion layer disposed on a first surface of the first metal layer, wherein the first fusion layer is disposed between the electrode assembly and the first metal layer.

3. The cell according to claim 2, wherein the first uncoated region is electrically connected with the first metal layer.

4. The cell according to claim 3, wherein the first fusion layer is provided with a first recessed portion, the first recessed portion is provided with the first conductive binder layer, and the first uncoated region is electrically connected with the first metal layer via the first conductive binder layer.

5. The cell according to claim 4, wherein a cohesive force between the first conductive binder layer and the first metal layer is less than that between the first conductive binder layer and the first uncoated region.

6. The cell according to claim 2, wherein the first body further comprises a first protective layer disposed on a second surface of the first metal layer.

7. The cell according to claim 6, wherein the first protective layer is provided with a third recessed portion, and the third recessed portion is provided with a first conductive element electrically connected with the first metal layer.

8. The cell according to claim 1, wherein
    the electrode assembly further comprises a second electrode sheet having a first surface coated with a second active material layer and a second surface opposite to the first surface, the second surface having a second region uncoated with the second active material layer as a second uncoated region; and
    the packaging bag further comprises a second body connected with or positioned space apart from the first body, and the second uncoated region is electrically connected with the second body.

9. The cell according to claim 1, wherein the electrode assembly further comprises a second electrode sheet having a first surface coated with a second active material layer and a second surface opposite to the first surface, the second surface having a second region uncoated with the second active material layer as a second uncoated region; and the packaging bag further comprises a second body, the first body and the second body define an accommodating space, the electrode assembly is received in the accommodating space, and the second uncoated region is electrically connected with the second body.

10. The cell according to claim 9, wherein
the first body comprises:
a first metal layer; and
a first fusion layer disposed on a first surface of the first metal layer, and the first fusion layer is disposed between the electrode assembly and the first metal layer;
the second body comprises:
a second metal layer; and
a second fusion layer disposed on a first surface of the second metal layer, and the second fusion layer is disposed between the electrode assembly and the second metal layer;
wherein the first fusion layer and the second fusion layer are disposed opposite to each other.

11. The cell according to claim 10, wherein the first uncoated region is electrically connected with the first metal layer, and the second uncoated region is electrically connected with the second metal layer.

12. The cell according to claim 10, wherein the first fusion layer is provided with a first recessed portion, the first recessed portion is provided with the first conductive binder layer, and the first uncoated region is electrically connected with first metal layer via the first conductive binder layer.

13. The cell according to claim 12, wherein a cohesive force between the first conductive binder layer and the first metal layer is less than that between the first conductive binder layer and the first uncoated region, and less than that between the first fusion layer and the second fusion layer.

14. The cell according to claim 10, wherein the first body further comprises a first protective layer disposed on a second surface of the first metal layer.

15. The cell according to claim 14, wherein the first protective layer is provided with a third recessed portion, and the third recessed portion is provided with a first conductive element electrically connected with the first metal layer.

16. The cell according to claim 10, wherein a sealing portion is formed at an end of the first body and an end of the second body respectively, configured to seal the accommodating space and provided with an insulating layer at an edge thereof.

17. The cell according to claim 10, wherein the electrode assembly is formed by sequentially stacking or winding a plurality of the first electrode sheets, a plurality of separators, and a plurality of the second electrode sheets;
the first uncoated regions of the plurality of the first electrode sheets are electrically interconnected to form a third conductive element, and the third conductive element is electrically connected with the first metal layer; and
the second uncoated regions of the plurality of the second electrode sheets are electrically interconnected to form a fourth conductive element, and the fourth conductive element is electrically connected with the second metal layer.

18. A battery, comprising a housing and a cell disposed in the housing, the cell comprising:
an electrode assembly, comprising:
a first electrode sheet having a first surface coated with a first active material layer and a second surface opposite to the first surface, the second surface having a first region uncoated with the first active material layer as a first uncoated region; and
a packaging bag, receiving the electrode assembly and comprising:
a first body, electrically connected with the first uncoated region on the second surface via a first conductive binder layer;
wherein a cohesive force between the first body and the first conductive binder layer is less than that between the first conductive binder layer and the first uncoated region.

19. The battery according to claim 18, wherein
the electrode assembly further comprises a second electrode sheet having a first surface coated with a second active material layer and a second surface opposite to the first surface, the second surface having a second region uncoated with the second active material layer as a second uncoated region; and
the packaging bag further comprises a second body connected with or positioned space apart from the first body, and the second uncoated region is electrically connected with the second body.

20. A battery, comprising a housing and a cell disposed in the housing, the cell comprising:
an electrode assembly, comprising:
a first electrode sheet having a first surface coated with a first active material layer and a second surface opposite to the first surface, the second surface having a first region uncoated with the first active material layer as a first uncoated region;
a second electrode sheet having a first surface coated with a second active material layer and a second surface opposite to the first surface, the second surface having a second region uncoated with the second active material layer as a second uncoated region; and
a packaging bag, comprising:
a first body; and
a second body, the first body and the second body cooperatively define an accommodating space, the electrode assembly is received in the accommodating space;
wherein the first uncoated region is electrically connected with the first body via a first conductive binder layer, and the second uncoated region is electrically connected with the second body.

* * * * *